US007601426B1

(12) United States Patent
Wilson et al.

(10) Patent No.: US 7,601,426 B1
(45) Date of Patent: Oct. 13, 2009

(54) INTUMESCENT SUBSTRATE COATING

(75) Inventors: Jeffrey M. Wilson, Tulsa, OK (US); Michael R. Kessler, Ames, IA (US); Roger Walker, Tulsa, OK (US)

(73) Assignee: The University of Tulsa, Tulsa, OK (US)

( * ) Notice: Subject to any disclaimer, the term of this patent is extended or adjusted under 35 U.S.C. 154(b) by 485 days.

(21) Appl. No.: 11/307,296

(22) Filed: Jan. 31, 2006

(51) Int. Cl.
*B32B 15/092* (2006.01)
*B32B 27/20* (2006.01)
*B32B 27/38* (2006.01)
*C08K 3/04* (2006.01)
*C08K 3/36* (2006.01)
*C08L 63/00* (2006.01)
*C09K 21/14* (2006.01)

(52) U.S. Cl. ............... 428/418; 428/332; 428/413; 523/179; 523/466; 523/468; 252/606

(58) Field of Classification Search ............. None
See application file for complete search history.

(56) References Cited

U.S. PATENT DOCUMENTS

| | | | |
|---|---|---|---|
| 3,852,240 A | 12/1974 | Smith | 260/47 |
| 3,992,358 A | 11/1976 | Schinabeck | 260/47 |
| 4,529,467 A * | 7/1985 | Ward et al. | 156/307.3 |
| 5,389,435 A | 2/1995 | Yap | 428/324 |
| 6,084,008 A | 7/2000 | Liu | 523/179 |
| 6,102,995 A | 8/2000 | Hutchings et al. | 106/18.15 |
| 6,472,070 B1 | 10/2002 | Muraoka et al. | 428/418 |
| 6,528,559 B1 | 3/2003 | Nakacho et al. | 524/116 |
| 6,771,502 B2 | 8/2004 | Getz, Jr. et al. | 361/703 |
| 6,884,745 B2 | 4/2005 | Yazici et al. | 502/101 |

OTHER PUBLICATIONS

Aerosil Fumed Silica: Product information for Aerosil 200, provided by Evonik Degussa web site (no date).*

* cited by examiner

*Primary Examiner*—Michael J Feely
(74) *Attorney, Agent, or Firm*—Head, Johnson & Kachigian P.C.

(57) ABSTRACT

An intumescent coating in the form of an initially liquid coating which cures to a solid and adheres to a substrate. The coating includes a flexible thermosetting epoxy, such as diglycidyl ether of bisphenol-A (DGEBA), with an aliphatic amine curing agent, expandable graphite flakes with reagent chemicals that react upon heating and decompose into gaseous products, and fumed silica. In the presence of heat or flame, an intumescent layer develops at the coating surface, insulating the substrate. The coating is found to add intumescent characteristics which provide heat resistant and fire retardant qualities.

11 Claims, 3 Drawing Sheets

INTUMESCENT SUBSTRATE COATING

BACKGROUND OF THE INVENTION

1. Field of the Invention

The present invention is directed to an initially liquid coating which adheres to a substrate and cures to form a solid coating thereon. In particular, the present invention is directed to an intumescent coating which has heat resistant and fire retardant qualities and is somewhat impact resistant upon curing.

2. Prior Art

It is either desirable or required to provide heat insulating and flame retardant characteristics to certain substrates. For example, piping or pipelines in a variety of applications, such as petrochemical processing plants, have a history of fire related accidents so that a heat resistant and fire retardant coating is advantageous on various pipes and pipelines. The piping may be composed of metal, however, various polymeric pipes are also used. In addition, various types of pipes are repaired with a carbon fiber reinforced polymeric composite system. The repaired pipe which is covered and coated with a polymeric composite system is susceptible to extreme heat and fire and will burn or melt. In the event the pipe is breached, additional flammable fluids may be released. Accordingly, a fire retardant coating would be desirable.

Various coatings and compositions have been developed over the years which can provide heat resistance and fire retardant characteristics to substrates. In general, known intumescent coatings form a billowy, charred layer of material in the presence of a flame, thus, insulating the substrate from heat and flame.

Many existing fire retardant materials are either fibrous or ceramic based and, thus, are very brittle and easily damaged upon any impact. A ceramic based fire retardant system, known as Emisshield I-A™ licensed by Wessex, Inc. was evaluated along with the present invention. The Emisshield™ product sold for several hundred dollars per gallon, was extremely costly and had little impact resistance.

In addition, there are various known compositions including heat expandable graphite flakes which are known to provide flame resistance. The graphite flakes are treated with reagent chemicals which, upon exposure to heat, decompose and release gases. This forces apart the layers of the graphite planes and creates bubbling or expansion.

At the same time, in particular applications, the intumescent coating should be impact resistant. For example, at petrochemical processing plants there is considerable activity and, if the coating becomes brittle, it can fall off of the substrate upon slight impact.

In the past, there have been various attempts to provide fire retardant and similar compositions.

Schinabeck (U.S. Pat. No. 3,992,358) discloses a composition including glycidyl polyethers or epoxy resins having a hardening agent with inert fillers including graphite and fumed silica. The additional graphite fillers do not intumesce, and would not serve as a fire retardant. Moreover, Schinabeck does not contemplate expandable graphite flakes.

Yap (U.S. Pat. No. 5,389,435) discloses a flame retardant composition of epoxy derived from bisphenol-A with graphite fibers added as strength additives. The flame retardant mechanism is a light weight glass scim containing an inorganic filler and epoxy resin laminated to the composite.

Smith (U.S. Pat. No. 3,852,240) discloses an epoxy resin of the glycidyl ether type and an aliphatic or aromatic primary amine-containing compound without intumescent or fire retardant properties.

Liu (U.S. Pat. No. 6,084,008) discloses a fire retardant intumescent coating having a polymeric binder and expandable graphite particles which form individual units of self-expansion. Liu includes 25% to about 50% solvent, and does not include epoxy resins. Additionally, there is no suggestion of using fumed silica to improve the strength of the charred formulation.

Muraoka et al. (U.S. Pat. No. 6,472,070) discloses a fire retardant paint containing an epoxy resin and expandable graphite inorganic filler. Muraoka et al. does not suggest any use of fumed silica to provide impact resistance or to improve the strength of the charred formation.

Nakacho et al. (U.S. Pat. No. 6,528,559) discloses a flame retardant including phenoxy-phosphazene resin with inorganic filler such as silica.

Nevertheless, there remains a need to provide an intumescent coating that is heat and flame resistant and has impact resistance.

Accordingly, it is a principal object and purpose of the present invention to provide an intumescent coating for substrates which will expand upon reaction to heat or fire to provide heat resistant and fire retardant characteristics.

It is a further object and purpose of the present invention to provide an intumescent coating for a substrate which is waterproof and has impact resistance.

SUMMARY OF THE INVENTION

The present invention is directed to an initially liquid coating which adheres to a substrate and cures to form a solid coating. The present invention is directed to a method and a system for an intumescent coating which has heat resistant and fire retardant qualities and is somewhat impact resistant upon curing.

The coating of the present invention includes three primary components. In a preferred embodiment, the coating includes a diglycidyl ether of bisphenol-A (DGEBA) epoxy, bisphenol-F, or novalac with an aliphatic amine, cycloaliphatic amine, or amido amine curing agent used as a hardener. The coating also includes fumed silica in the form of an amorphous colloidal silicon dioxide. Finally, the coating includes an intumescent agent in the form of expandable graphite flakes treated with reagents which, in the presence of heat or flame, decompose into gaseous products.

The coating is applied to a substrate in a coating thickness between 0.02 inches and 0.2 inches, preferably between 0.05 inches and 0.15 inches. The substrate may be chosen from a carbon reinforced epoxy composite material and metals. The coating forms an intumescent layer at the coating surface, insulating the substrate.

DETAILED DESCRIPTION OF THE PREFERRED EMBODIMENTS

Figure 1:
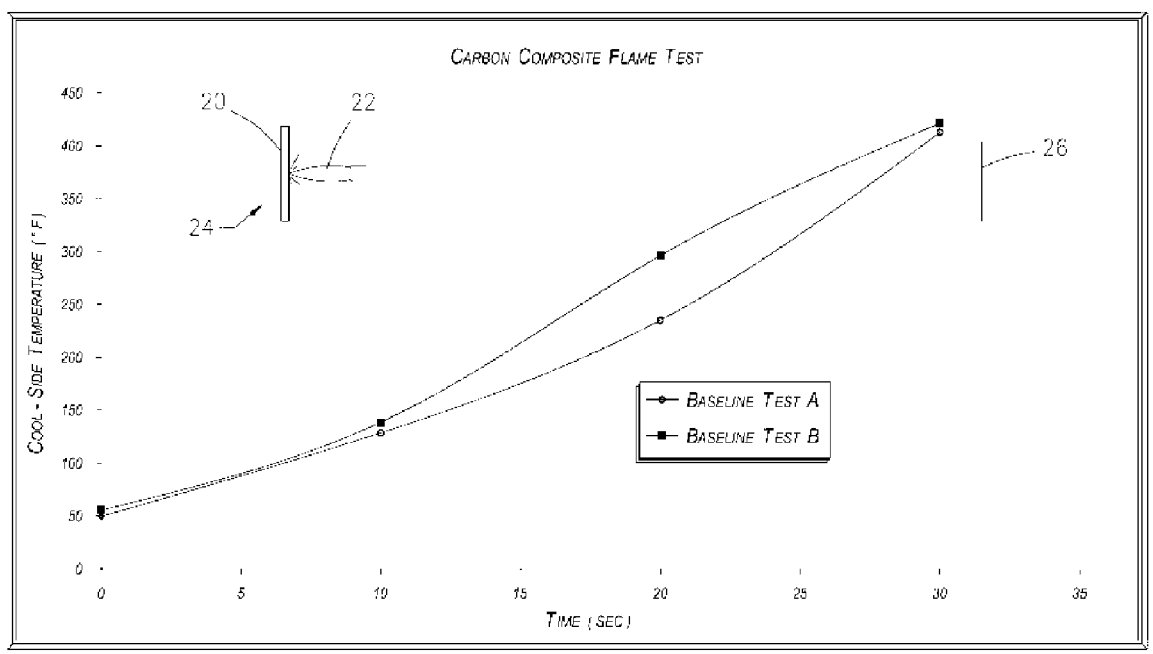
FIG. 1 illustrates a chart of the cool side temperature of test panels versus time for a flame test without the coating of the present invention.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

The present invention is directed to an epoxy based fire retardant and heat resistant coating used to protect substrates from heat and flames. In the presence of heat or flames, an intumescent layer develops at the coating surface, insulating the substrate.

Experimental testing was performed in three categories. Initially, panels of a carbon/epoxy material which might be used in pipes or in a known repair system were subjected to direct flame impingement without any coating and evaluated. Additionally, as described in detail herein below, a commercially available ceramic type coating applied to the panels was evaluated. Finally, coatings comprising the present invention were applied to the panels and the coated panels were tested and evaluated.

Experimental Set-Up

Flat panels of carbon fiber/epoxy were subjected to direct flame impingement from a propane heat source. A test fixture was created to support the flat panels, a propane heat source, and an infrared thermometer that measured the temperature of the panel on the side opposite that of the flame on what is considered the "cool-side" of the panel. The duration of the test was recorded in 10 second increments and visual observations were recorded.

Materials for Experiment

The heat source used was provided by a 14.1 ounce propane bottle manufactured by the Bernzomatic Co. of Rochester, N.Y. Literature provided by the Bernzomatic Co. shows that the combustion of this fuel in air results in a 3,450° F. flame.

The carbon fiber epoxy panels for the experimental testing were created from existing pipe repair products. The epoxy was a two-part system of diglycidyl ether of bisphenol-A (DGEBA) type resin cured in situ with an aliphatic amine hardener and flexibility additives and is referred to as Standard Wet Out. The carbon fiber cloth used in the experiments was of a plain weave architecture consisting of a 6 k tow count in the warp direction and a 3 k tow count in the fill direction. Two layers of the carbon/epoxy were used in the experiments for each panel.

The commercially available coating evaluated in this work was a protective coating for ceramic materials known as Emisshield I-A™ which is licensed by Wessex, Inc. of Blacksburg, Va. Emisshield is an intumescent ceramic coating that was developed by NASA's Ames Research Center in 1994.

The coating of the present invention includes three primary components. A preferred embodiment of the epoxy based coating developed in this invention was formulated through trial and error evaluations of various ratios of expandable flake graphite, fumed silica, and thermosetting epoxy resin.

The epoxy resin, SLS-350, is a DGEBA epoxy produced by Citadel Technologies of Tulsa, Okla. It is believed that a thermosetting cyanate ester (polycyanurate) might alternately be utilized or other epoxy systems.

In other use applications, it is a particulate thickened, aliphatic amine cured resin that has been used as a primer coating to assist a carbon composite overwrap in adhesion to a pipe wall. In the present use application, however, it is used as the binding agent of the intumescent coating. Cab-O-Sil™, a synthetic, amorphous, colloidal silicon dioxide produced by the Cabot Corporation of Billerica, Mass. was used as the fumed silica. Fumed silica is sometimes used to tailor the thixotropy of epoxy resins, but has been found during this study to assist in the stabilization of the billowy, intumescent layer. The intumescent agent used in the present invention was 3558-Expandable Flake Graphite and is produced by Anthracite Industries of Sanbury, Pa. It is manufactured by treating flake graphite with various types of reagents that migrate between the graphene layers in graphite crystal and remain stable. When exposed to a rapid increase in temperature, the reagents decompose into gaseous products, which result in high inter-graphene layer pressure that develops enough force to push apart graphite basal planes. The result of the graphite planar separation is an increased volume of up to 300 times, a lower density, and 10-fold increase in graphite surface area. These attributes allow the expandable flake graphite to be used as an intumescent agent.

Various formulations of the present invention were tested, however, a preferred embodiment was formulated with approximately 50-55% by weight of thermosetting epoxy with curing agent, approximately 40-45% by weight of expandable graphite flakes, and approximately 5-10% by weight of fumed silica. More specifically, one preferred formulation was tested with approximately 54.4% by weight of thermosetting epoxy with curing agent, approximately 40.3% by weight of expandable graphite flakes, and 5.3% by weight of fumed silica.

Specimen Manufacturing

Two layers of the carbon fiber/epoxy panels were utilized in all tests conducted in the study. The panels measured approximately 12.0 inches by 6.0 inches by 0.047 inches thick. The panels were fabricated by hand lay-up, in a dry film release spray-coated pan, and a dry film release spray-coated Plexiglass caul plate was placed on the top of panel with less than 2.5 psi of pressure. The caul plate was placed on the composite panel in such a way as to remove air bubbles from the epoxy. The panels were allowed to cure over-night at room temperature.

The commercially available ceramic, intumescent coating was applied to select panels according to the manufacturer's recommendations. In this procedure, two applications are required for the coating to achieve its full fire-retardant effectiveness. A twelve hour drying time is required between each application. At the conclusion of the coating application, the average thickness was 0.0665 inches for panel "A" and 0.0783 inches for panel "B".

With regard to the present invention, several mix ratios of the expandable graphite flake, fumed silica, and epoxy resin were created in this study to produce a coating that would yield adequate fire retardant properties. In all formulations, the ratios were created volumetrically between the epoxy resin (without hardener additive), fumed silica, and expandable graphite flake (based on an unpacked dry volume). The hardening agent was then added to the mixture only prior to the application of the coating to the carbon composite panel at a mass ratio of 1.85 grams of resin to 1.0 gram of hardener. The volumetric ratios evaluated in this study are shown in Table 1 below as well as the average thickness for each panel tested.

TABLE 1

Volumetric Mix Ratios for Coatings

| Volumetric Mix Ratios | | | Avg. Panel Thickness (inches) | |
|---|---|---|---|---|
| Epoxy Resin | Fumed Silica* | Expandable Flake* | A | B |
| 1 | 0 | 0 | 0.078 | 0.076 |
| 1 | 0 | 1 | 0.068 | 0.069 |
| 1 | 1 | 1 | 0.084 | 0.085 |
| 2 | 1 | 2 | 0.099 | 0.087 |
| 1 | 2 | 1 | 0.070 | 0.080 |

*based on unpacked dry volume

The coatings of the present invention shown in Table 1 herein are referred to by their volumetric mix ratios: 1-0-0, 1-0-1, 1-1-1, 2-1-2, and 1-2-1.

For each panel configuration, two samples were prepared: two panels of the baseline carbon/epoxy repair system (with no coating), two panels of the carbon/epoxy system with the commercially available coating, and two panels coated with each mix ratio shown in Table 1.

Testing Procedure

A test fixture was fabricated to test the carbon fiber/epoxy composite panels in the presence of a flame. An Omega model OS53x-CF infrared thermometer was used to monitor the temperature of the panel of the side opposite the flame on the cool-side. The flame source was supplied via a 14.1 ounce propane tank and the flame was adjusted so that a jet fire was produced and the tip of the flame was in direct contact with the test panel.

The nozzle of the flame source was adjusted so that its tip was approximately 5.0 inches from the panel front. The nozzle was also adjusted so that the incident angle of the flame was normal to the panel.

Temperature measurements were recorded every 10 seconds until either ignition of the panel occurred or a steady state was achieved within 6 minutes.

Results and Discussion

FIG. 1 shows the cool-side temperature data for the baseline carbon/epoxy composite panels (with no coating). As seen in the inset, the panel 20 was subjected to a flame 22 and temperature readings were taken on the cool side 24. The data show that after 30 seconds, the cool-side temperature of the baseline carbon/epoxy was over 400° F. Additionally, within 35 seconds, the flame fully penetrated the carbon composite and caused ignition of the panel as depicted by line 26.

The results from the baseline carbon/epoxy panel tests show justification to explore coating options to reduce the failure and the combustibility of the pipe repair system.

Panels identical to those tested in the baseline panel tests were also produced, with the addition of two layers of the Emisshield I-A™ ceramic coating added as a fire retardant. Upon contact with the flame, the ceramic coating produced an intumescent layer that insulated the carbon/epoxy composite panel.

Figure 2:
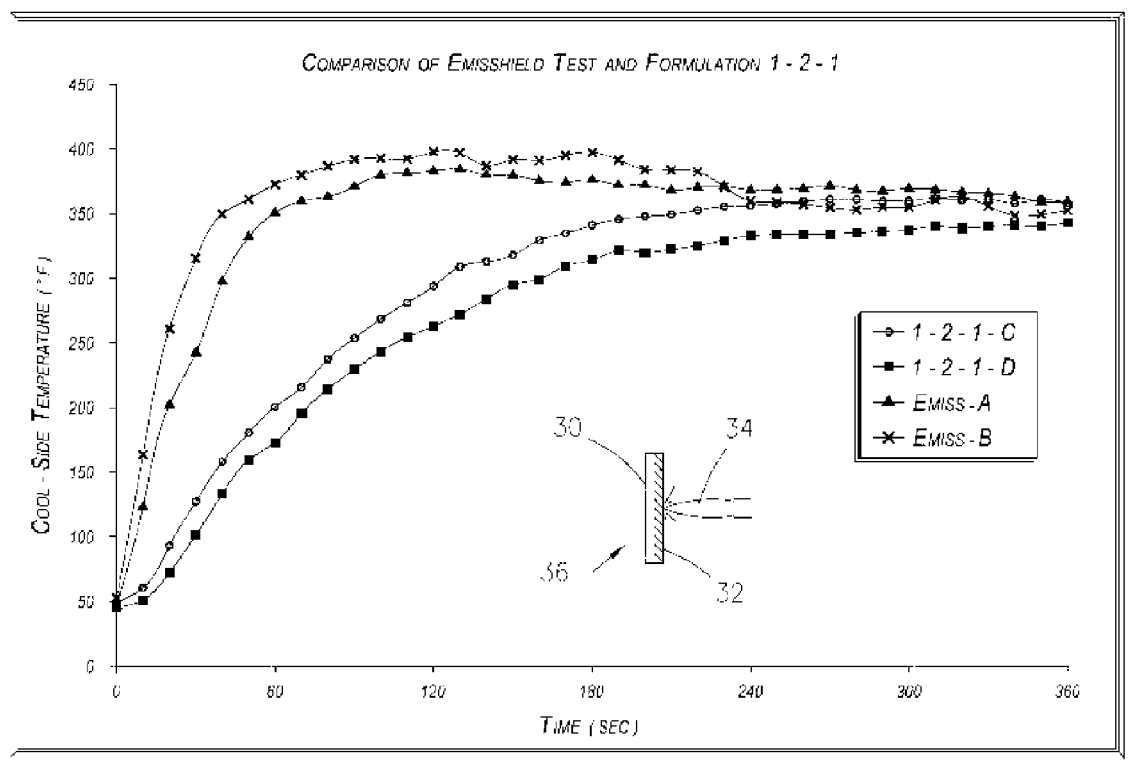
FIG. 2 illustrates a chart of the cool side temperature of test panels versus time for a commercially available coating and for coatings formulated according to the present invention.

FIG. 2 displays the results of the Emisshield™ ceramic coating tests. As seen in the inset, each panel 30 was coated with a ceramic coating 32 and then subjected to a flame 34. Temperature readings were taken on the cool side 36. The data show that the cool-side temperature reached a maximum temperature near 400° F. within two minutes of testing and then lowered to a value near 350° F. after five minutes. The Emisshield™ coating 32 was sufficient to not allow the flame to penetrate the carbon/epoxy composite panel and prevented the panel from igniting.

Although the Emisshield™ ceramic coating performed satisfactorily, it was very brittle to the touch and therefore is not well suited for industrial applications where damage due to impact is possible. The coating of the present invention was not as susceptible to impact damage as the ceramic based coating tested. Tests were also conducted for formulations 1-0-0, 1-0-1, 1-1-1, 2-1-2 and 1-2-1. With the exception of panels of 1-2-1, all failed due to flame penetration in well under 6 minutes. It is obvious formulation 1-0-0 will fail prematurely since no intumescent particles are present and thus is 100% epoxy; the results show that the best performing 1-0-0 panel failed within 45 seconds. The other four formulations contained the expandable flake graphite, and therefore showed more desirable fire retardant characteristics than the SLS-350 epoxy by itself. Formulations 1-1-1, 2-1-2, and 1-0-1, however, proved to have an unstable intumescent layer in the presence of the high velocity propane flame. As the billowy layer developed, the velocity of the propane flame proved to be too high of a load and would cause dispersion of the intumescent particles into the air. This action would cause subsequent graphite flakes to intumesce until there was no more coating protecting the carbon composite. With the bare carbon composite exposed, the flame penetrated the test panel within 35 seconds.

Additional tests were run of the 1-2-1 formulation as shown below and were plotted on FIG. 2.

TABLE 2

Additional 1-2-1 Test Panels

| Mix Ratio | | | Avg. Panel Thickness (inches) | |
|---|---|---|---|---|
| Epoxy Resin | Fumed Silica | Expandable Flake Graphite | C | D |
| 1 | 2 | 1 | 0.151 | 0.142 |

Table 2 also shows that panels "C" and "D" were significantly thicker than panels "A" and "B" of the initial 1-2-1 formulation (see Table 1). The results of these tests are depicted in FIG. 2.

As shown in FIG. 2, the coating applied to panels "C" and "D" of formulation 1-2-1 proved successful. The maximum temperature experienced during the 6 minute test was 360° F. (panel "C"). The billowy intumescent layer that developed during the test appeared to be stable with few intumescent particles being dispersed into the atmosphere. The cool-side of the panel showed no discoloration of epoxy due to elevated temperature within the 6 minute test.

A comparison plot of the test results of formulation 1-2-1 (thick application) to Emisshield™ is shown in FIG. 2. During the first four minutes of testing, the cool-side temperature of the carbon composite coated with Emisshield™ is above those panels coated with the present invention, formulation 1-2-1. After four minutes, however, the cool side temperatures of the present invention formulation 1-2-1 and Emisshield have reached a steady state value.

Figure 3:
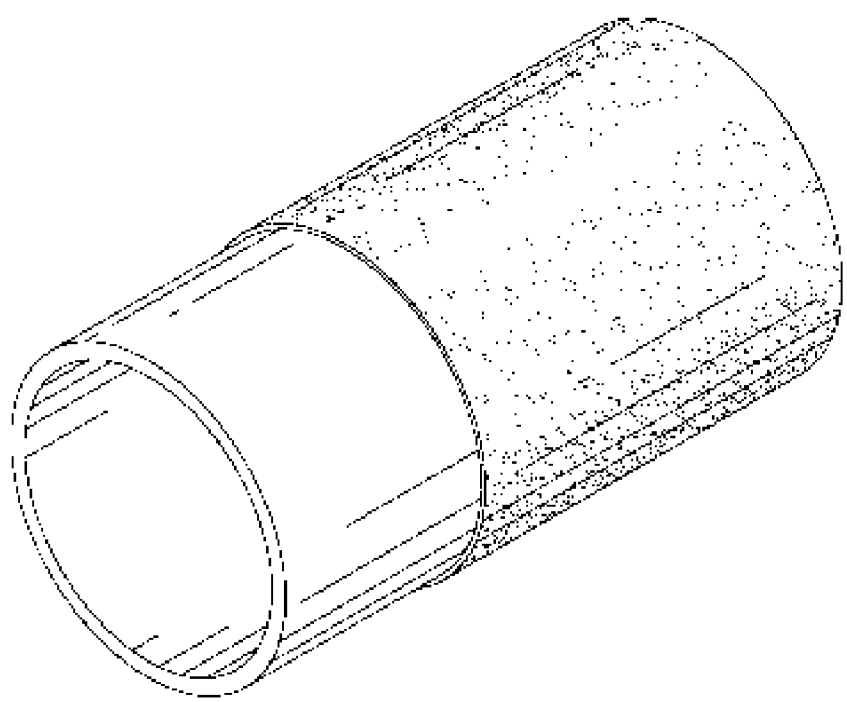
FIG. 3 illustrates a perspective view of a pipeline with the coating of the present invention applied thereon.
Figure 4:
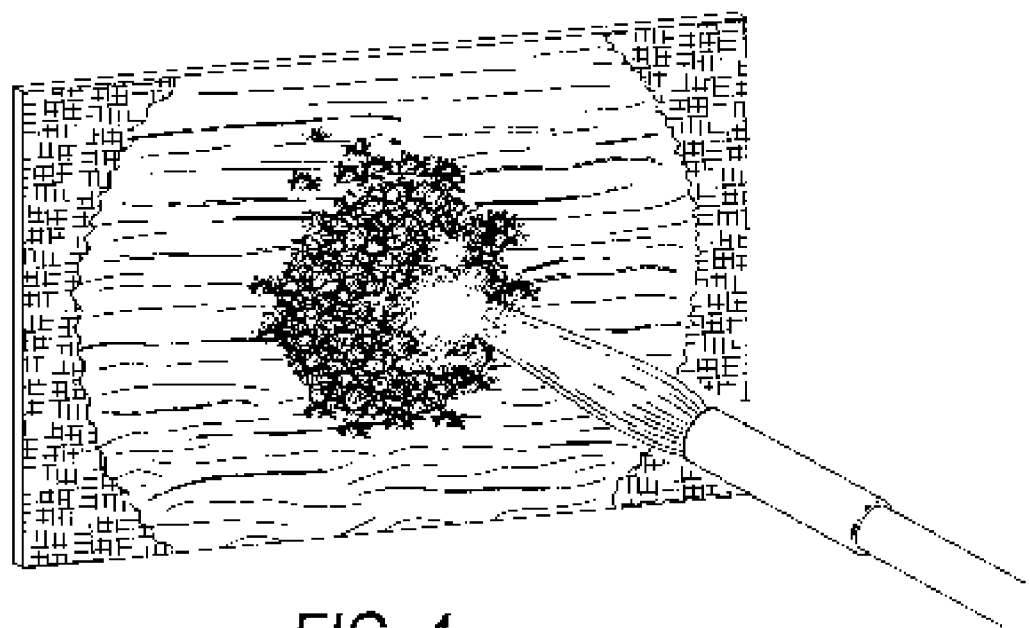
FIG. 4 illustrates a perspective view of a test panel with the intumescent substrate coating of the present invention subject to a flame test.

FIG. 3 illustrates a perspective view of a pipe with the coating of the present invention applied thereto. FIG. 4 is a perspective view of a test panel with the intumescent substrate coating of the present invention subject to a flame test.

In summary, direct high velocity propane flame impingement onto composite carbon fiber/epoxy panels (with no coating) resulted in combustion within 35 seconds. The same composite panels coated with a commercially available ceramic-based intumescent coating proved incombustible under the conditions outlined in this report. This ceramic coating, however, exhibited brittle characteristics that would prove difficult to overcome if left exposed in an industrial setting. The formulation of thermosetting epoxy, fumed silica, and expandable flake graphite developed as part of this invention proved incombustible, resulted in very comparable results to the commercially available ceramic coating and had impact resistant qualities.

Whereas, the present invention has been described in relation to the drawings attached hereto, it should be understood that other and further modifications, apart from those shown or suggested herein, may be made within the spirit and scope of this invention.

What is claimed is:

1. A liquid coating formulation comprising:
   (a) approximately 50% to 55% by weight of a flexible thermosetting epoxy with an aliphatic amine curing agent,
   (b) approximately 40% to 45% by weight of expandable crystalline graphite flakes treated with reagent chemicals that react upon heating and decompose into gaseous products, and
   (c) approximately 5% to 10% by weight fumed silica; wherein said weight percentages are based on the weight of the liquid coating formulation;
   wherein the liquid coating formulation cures to an intumescent, impact resistant solid and adheres to a substrate.

2. The liquid coating formulation as set forth in claim 1 wherein said thermosetting epoxy is diglycidyl ether of bisphenol-A (DGEBA).

3. The liquid coating formulation as set forth in claim 1 wherein said fumed silica is an amorphous colloidal silicon dioxide.

4. The liquid coating formulation as set forth in claim 1 comprising:
   (a) approximately 54.4% by weight of said flexible thermosetting epoxy with said aliphatic amine curing agent,
   (b) approximately 40.3% by weight of said expandable crystalline graphite flakes treated with reagent chemicals that react upon heating and decompose into gaseous products, and
   (c) approximately 5.3% by weight of said fumed silica.

5. A carbon reinforced epoxy composite substrate coated with and adhered to an intumescent, impact resistant solid coating; wherein the intumescent, impact resistance solid coating is a cured product of the liquid coating formulation as set forth in claim 1.

6. A metal substrate coated with and adhered to an intumescent, impact resistant solid coating; wherein the intumescent, impact resistance solid coating is a cured product of the liquid coating formulation as set forth in claim 1.

7. A substrate coated with and adhered to an intumescent, impact resistant solid coating; wherein the intumescent, impact resistance solid coating is a cured product of the liquid coating formulation as set forth in claim 1 and wherein said coating is between 0.02 inches and 0.2 inches thick.

8. The coated substrate as set forth in claim 7 wherein said coating is between 0.05 inches and 15 inches thick.

9. A liquid coating formulation comprising:
   (a) a flexible thermosetting epoxy with an aliphatic amine curing agent,
   (b) fumed silica, and
   (c) expandable crystalline graphite flakes treated with reagent chemicals that react upon heating and decompose into gaseous products;
   wherein the volumetric mix ratio of (a), unpacked dry (b), and unpacked dry (c) is 1:2:1; and
   wherein the liquid coating formulation cures to an intumescent, impact resistant solid and adheres to a substrate.

10. The liquid coating formulation as set forth in claim 9 wherein said thermosetting epoxy is diglycidyl ether of bisphenol-A (DGEBA).

11. The liquid coating formulation as set forth in claim 9 wherein said fumed silica is an amorphous colloidal silicon dioxide.

* * * * *

UNITED STATES PATENT AND TRADEMARK OFFICE
CERTIFICATE OF CORRECTION

PATENT NO. : 7,601,426 B1  
APPLICATION NO. : 11/307296  
DATED : October 13, 2009  
INVENTOR(S) : Wilson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 595 days.

Signed and Sealed this

Fifth Day of October, 2010

David J. Kappos  
*Director of the United States Patent and Trademark Office*